United States Patent
Theisen et al.

(10) Patent No.: US 7,672,767 B2
(45) Date of Patent: Mar. 2, 2010

(54) METHOD AND DEVICE FOR CONTROLLING AN OCCUPANT PROTECTION DEVICE IN A VEHICLE

(75) Inventors: Marc Theisen, Besigheim (DE); Volker Walz, Bietigheim-Bissingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/561,565

(22) PCT Filed: Jun. 26, 2004

(86) PCT No.: PCT/DE2004/001350
§ 371 (c)(1),
(2), (4) Date: May 4, 2006

(87) PCT Pub. No.: WO2005/002928
PCT Pub. Date: Jan. 13, 2005

(65) Prior Publication Data
US 2006/0238319 A1 Oct. 26, 2006

(30) Foreign Application Priority Data
Jun. 27, 2003 (DE) ................. 103 28 976

(51) Int. Cl.
*B60R 22/00* (2006.01)
(52) U.S. Cl. .............. 701/45; 701/46; 180/268; 180/271; 340/438

(58) Field of Classification Search ............ 701/45, 701/46; 180/268, 271, 272; 340/435, 436, 340/438
See application file for complete search history.

(56) References Cited

U.S. PATENT DOCUMENTS

| 6,167,335 A | * | 12/2000 | Ide et al. ............... 701/45 |
| 6,249,730 B1 | | 6/2001 | Wallace et al. |
| 6,532,408 B1 | | 3/2003 | Breed |
| 2003/0105569 A1 | * | 6/2003 | Roelleke ............... 701/45 |

FOREIGN PATENT DOCUMENTS

| EP | 1 306 269 | 5/2003 |
| WO | WO 01/94158 | 12/2001 |

* cited by examiner

*Primary Examiner*—Gertrude Arthur Jeanglaud
(74) *Attorney, Agent, or Firm*—Kenyon & Kenyon LLP

(57) ABSTRACT

A method for triggering an occupant protection device in a vehicle including the steps: detecting a first measured variable and simultaneously generating a corresponding first signal for indicating a necessity for triggering at least one occupant protection device; detecting an acceleration value in the z direction and simultaneously generating a corresponding second signal; calculating a trigger signal for triggering at least one occupant protection device as a function of the first and second signals, and triggering the at least one occupant protection device as a function of the calculated trigger signal. An appropriate device is also described.

19 Claims, 1 Drawing Sheet

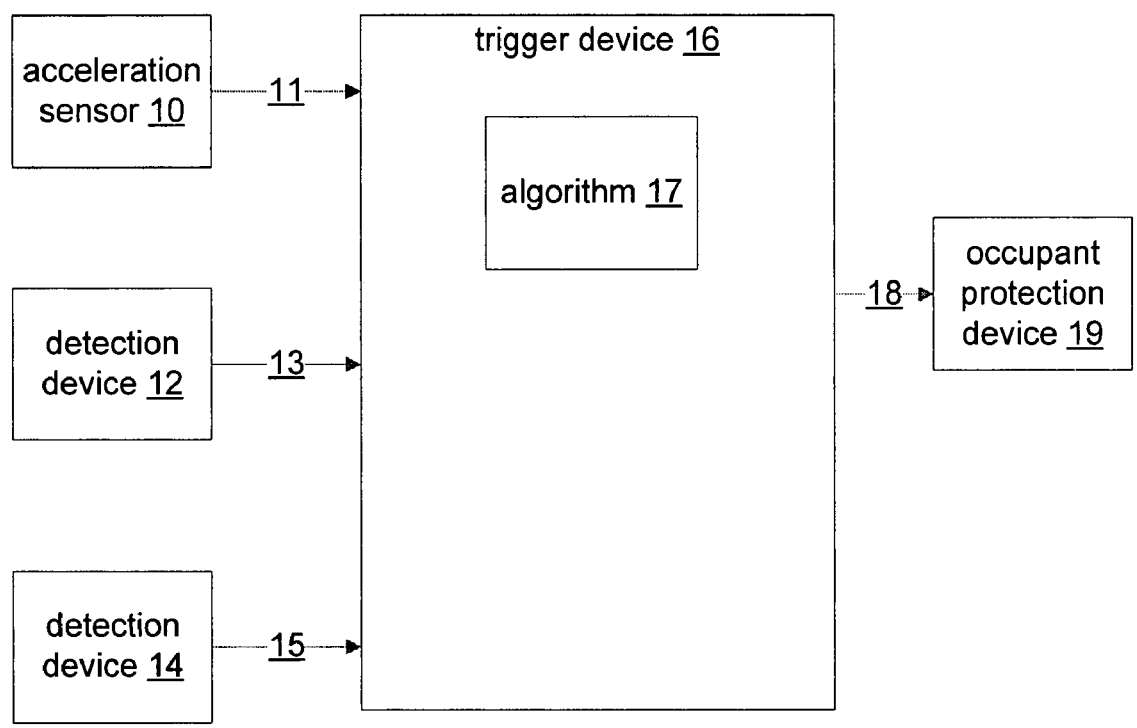
FIGURE

METHOD AND DEVICE FOR CONTROLLING AN OCCUPANT PROTECTION DEVICE IN A VEHICLE

CROSS-REFERENCE TO RELATED APPLICATIONS

The present application is a national-phase application under 35 U.S.C. § 371 based on PCT application PCT/DE2004/001350 filed on Jun. 26, 2004, and the present application claims priority based on German Patent Application Number 103 28 976.3, filed in Germany on Jun. 27, 2003.

FIELD OF THE INVENTION

The present invention relates to a method for triggering an occupant protection device in a vehicle, and in particular a method for triggering restraining means in a passenger car.

BACKGROUND INFORMATION

Triggering of restraining means, such as airbags of different design or triggerable seat belt tensioners, is nowadays effectuated on the basis of sensors for detecting acceleration in the longitudinal direction and the transverse direction of the vehicle, i.e., the x and y directions. In addition, analysis of upfront or pre-crash radar sensors is known which may trigger occupant protection means in particular, such as adjustment of a seat backrest or closing of the vehicle windows or the sun roof. When driving over or through road bumps, such as a pothole, a curb, a wooden tie, a railroad track or even a ditch, relatively high acceleration values are detected for a short time in the x/y plane; however, deployment of the restraining means is not necessary in such "misuse" driving situations, as they are known. Today's systems for triggering restraining devices in vehicles may not unambiguously differentiate such operating states, such as off-roading, from an actually dangerous driving situation, such as an imminent crash.

SUMMARY OF THE INVENTION

The method according to the present invention for triggering an occupant protection device in a vehicle and the device according to the present invention have the advantage over the known approach that a precise differentiation is made possible between non-deployment of the occupant protection devices in the event of road bumps, off-road driving, or misuse driving states and deployment of the occupant protection devices in the event of a crash. Road bumps are thus recognized and this information is taken into account in the decision about deployment or non-deployment of occupant protection devices. A precise, reliable, and robust deployment decision is calculable on this basis and unintentional deployments may be prevented.

The present invention is essentially based on the idea that the vehicle's acceleration in the z direction, i.e., the vertical direction, is detected and utilized in order to identify innocuous road bumps at high accelerations in the x/y plane.

This means that a method for triggering an occupant protection device in a vehicle is provided having the following steps: detecting a first measured variable and simultaneously generating a corresponding first signal for indicating a necessity for triggering the occupant protection device; detecting an acceleration value in the z direction and simultaneously generating a corresponding second signal; calculating a trigger signal for triggering at least one occupant protection device as a function of the first and second signals, and triggering the at least one occupant protection device as a function of the calculated trigger signal. In this way, a high acceleration value in the x/y plane, for example which would result in a deployment, may be corrected with a likewise occurring acceleration value in the z direction, in order to avoid an erroneous deployment, e.g., when driving off-road.

According to a preferred refinement, acceleration values in the x and/or y direction and/or a measured variable, which describes the area ahead of the vehicle and/or the vehicle surroundings, are detected as the first measured variable. This has the advantage that a possible pre-crash system refers to the longitudinal and transverse acceleration values and/or the results of monitoring the area ahead of the vehicle.

According to another preferred refinement, the area ahead of the vehicle and/or the vehicle surroundings is/are detected in addition to detecting an acceleration value in the x and/or y direction under simultaneous generation of a further signal which, like the first signal, is incorporated into the calculation of the trigger signal for triggering the at least one occupant protection device as a function of the level of the second signal. A comprehensive sensor system including correspondingly generated sensor signals may be used for calculating the triggering of occupant protection devices in an advantageous manner.

According to another preferred refinement, acceleration sensors are used for detecting the first measured variable or radar sensors, lidar sensors, video sensors, or ultrasonic sensors are used for detecting the vehicle surroundings and/or the area ahead of the vehicle. This offers the possibility of providing the detection of the vehicle surroundings and the area ahead for generating the first measured variable in all kinds of ways.

According to another preferred refinement, airbags such as driver and/or passenger and/or side and/or head and/or knee and/or window airbags and/or electrically operable side windows and/or sunroof and/or seats and/or reversible or pyrotechnical seat belt tensioners are triggered as the occupant protection device. The advantage is that a combination of several occupant protection devices for protecting the occupants is triggerable on the basis of the method according to the present invention.

According to another preferred refinement, the level of the first signal is reduced during the calculation of the trigger signal as a function of the second signal and/or the vehicle model. An advantageous adaptation of the deployment response of the occupant protection devices takes place due to this method step.

According to another preferred refinement, only the level peaks of the first signal are reduced as a function of the second signal or the level of the first signal is reduced by a predefined value as a function of the level of the second signal. This has the advantage of a simplified operation during calculation of the trigger signal.

According to another preferred refinement, the trigger threshold for triggering the at least one occupant protection device is elevated during the calculation of the trigger signal as a function of the second signal. This method step also results in a simple adaptation of the deployment response.

According to another preferred refinement, an elevation of the deployment threshold or a reduction in the level of the first signal is carried out during the calculation of the deployment signal as a function of the characteristic-velocity of the vehicle or the relative velocity of the vehicle with respect to an obstacle. In this way, the vehicle velocity as an additional variable to be observed may be advantageously incorporated into the calculation.

BRIEF DESCRIPTION OF THE DRAWING

FIG. 1 shows a schematic block diagram for the purpose of elucidating an embodiment of the present invention.

DETAILED DESCRIPTION

A schematic block diagram is represented in the FIGURE which shows individual system components and their interrelationship. The occupant protection system according to the FIGURE has an acceleration sensor 10 for detecting an acceleration in the x and/or y direction, i.e., in the longitudinal and/or transverse direction of the vehicle. This sensor 10 may thus preferably detect acceleration values in the x/y plane and generate a corresponding sensor signal 11. Moreover, the system according to the FIGURE includes a detection device 12 for detecting accelerations in the z direction, i.e., the vertical direction, which corresponds to the vertical axis of a vehicle. This sensor 12 also determines acceleration values, in this case in the z direction, and generates corresponding sensor signals 13.

In addition, a detection device 14 is preferably provided for detecting the area ahead of the vehicle or the vehicle surroundings. Detection device 14 may alternatively detect data from other vehicle systems, such as the ABS and/or ESP system, which indicates a dangerous situation such as a slip on different wheels of the vehicle. Detection device 14 also outputs a signal 15. According to an exemplary embodiment, detection block 14 (upfront sensor), designed as a pre-crash sensor, has a radar sensor, a lidar sensor, a video sensor, or an ultrasonic sensor for example, preferably including corresponding signal processing. If the vehicle has a roll control system (active body control system) for example, which has an acceleration sensor 12 for detecting accelerations in the z direction, this sensor may be used in the system according to the FIGURE. Detection device 10 for detecting the acceleration in the x and/or y direction has at least one sensor which preferably may be integrated into a trigger device 16.

Signals 11, 13, and 15 of detection devices 10, 12, and 14 are coupled to trigger device 16, preferably via wires or optical fibers or via a wireless link. Detected acceleration values 11, 13 or detected measured variables 15 of pre-crash sensor 14 are supplied to an algorithm 17 in trigger device 16, i.e., the control unit, for calculating a trigger signal 18. The calculation is preferably carried out on a processor (not shown) on which algorithm 17 is processed. Based on the z acceleration values in connection with the x and/or y acceleration values, trigger device 16 may now detect road bumps, such as a pothole, a curb, a wooden tie, a railroad track, or a ditch, possibly off-roading, and control triggering, i.e., trigger signal 18, of at least one occupant protection device 19 as a function thereof.

According to algorithm 17, manipulation of the deployment decision may take place, for example, in such a way that an x acceleration signal, depending on the vehicle model, is reduced at an appropriate level of the z acceleration value. Only the peak levels of the acceleration signal (x direction) are then preferably reduced, or the entire signal level is reduced by a predefined amount. There is also the possibility of designing algorithm 17 in such a way that the deployment threshold for generating trigger signal 18 is elevated as a function of the acceleration in the z direction. A further possible exemplary embodiment of algorithm 17 and thus of the system response lies preferably in the fact that the reduction of the acceleration signal (x direction) and/or the elevation of the deployment threshold take(s) place as a function of the characteristic-velocity and/or the relative velocity measured by pre-crash sensor 14. This means that, in consideration of the z acceleration value, deployment of the occupant protection device(s) is stopped, even though the acceleration value in the x and/or y direction would trigger a deployment under normal circumstances. Due to the entirety of information, trigger device 16 is thus able to recognize that an off-road drive is taking place or a misuse driving state exists in which deployment of the occupant protection device is neither sensible nor desirable. Thereupon, algorithm 17 ensures that trigger signal 18 for deployment of at least one occupant protection device 19 is not output.

Occupant protection devices 19 or restraining means to be controlled preferably include pyrotechnical or reversible seat belt tensioners and/or airbags such as driver airbag, passenger airbag, side airbag, head airbag, knee airbag and/or window airbag, etc. In addition, occupant protection devices 19 also preferably include electrically adjustable seats or an electrically operable sunroof and/or electrically operable side windows. Control of these occupant protection devices 19 is assumed by one or multiple control units 16 which issue the appropriate trigger signal 18 on the basis of the sensor signals processed by the algorithm. In this way, it is possible to recognize an off-road driving situation and to preferably reduce the sensitivity of the airbag deployment system, for example. Compared to the short duration of an accident, the analysis of the signals may take place here over a relatively long period of time.

Although the present invention was described above based on a preferred exemplary embodiment, it is not restricted thereto, but rather is modifiable in many ways.

The method and device according to the present invention are not restricted to passenger cars; they may also be used in any land vehicles and watercraft, e.g., in a powerboat. In addition, any further signals, which are additionally available to the algorithm for generating a trigger signal to further improve the deployment response, may be generated via additional sensors.

What is claimed is:

1. A method for triggering an occupant protection device in a vehicle, comprising:
    detecting a first measured variable while simultaneously generating a corresponding first signal for indicating a necessity for triggering the occupant protection device;
    detecting an acceleration value in a z direction while simultaneously generating a corresponding second signal, wherein the z direction is a vertical direction;
    calculating a trigger signal for triggering the occupant protection device as a function of the first signal and the second signal, wherein a level of the occupant protection device triggering signal is reduced as a function of at least one of a vertical axis acceleration signal and a vehicle model; and
    triggering the occupant protection device as a function of the calculated trigger signal, wherein a deployment threshold for generating the trigger signal is elevated as a function of the acceleration in the z direction.

2. The method as recited in claim 1, wherein the first measured variable includes at least one of an acceleration value in an x direction, an acceleration value in a y direction, and a measured variable that describes at least one of an area ahead of the vehicle and a vehicle surroundings.

3. The method as recited in claim 1, further comprising:
    performing a first detecting of an acceleration value in at least one of an x direction and a y direction;
    performing a second detecting of at least one of an area ahead of the vehicle and a vehicle surroundings;

simultaneously with at least one of the first detecting and the second detecting, simultaneously generating a third signal that is incorporated into the calculating of the trigger signal.

4. The method as recited in claim 3, wherein:
the detecting of the first measured variable is performed by an acceleration sensor; and
the detecting of at least one of the area ahead of the vehicle and the vehicle surroundings are accomplished by one of a radar sensor, a lidar sensor, a video sensor, and an ultrasonic sensor.

5. The method as recited in claim 1, wherein:
the occupant protection device includes at least one of an airbag, an electrically operable side window, a sunroof, a seat, and one of a reversible seat belt tensioner and a pyrotechnical seat belt tensioner, and
the airbag includes at least one of a driver airbag, a passenger airbag, a side airbag, a head airbag, a knee airbag, and a window airbag.

6. The method as recited in claim 1, wherein one of:
only level peaks of the first signal are reduced as a function of the second signal, and
the level of the first signal is reduced by a predefined value as a function of a level of the second signal.

7. The method as recited in claim 1, further comprising:
raising a trigger threshold for triggering the occupant protection device in the calculating of the trigger signal as a function of the second signal.

8. The method as recited in claim 1, wherein one of a raising of a trigger threshold and a lowering of a level of the first signal is carried out in a calculating of the trigger signal as a function of one of a characteristic-velocity of the vehicle and a relative velocity of the vehicle with respect to an obstacle.

9. The method as recited in claim 1, further comprising:
performing a first detecting of an acceleration value in at least one of an x direction and a y direction;
performing a second detecting of at least one of an area ahead of the vehicle and a vehicle surroundings;
simultaneously with at least one of the first detecting and the second detecting, simultaneously generating a third signal that is incorporated into the calculating of the trigger signal;
wherein the first measured variable includes at least one of an acceleration value in an x direction, an acceleration value in a y direction, and a measured variable that describes at least one of an area ahead of the vehicle and a vehicle surroundings, and
wherein the detecting of the first measured variable is performed by an acceleration sensor, and the detecting of at least one of the area ahead of the vehicle and the vehicle surroundings are accomplished by one of a radar sensor, a lidar sensor, a video sensor, and an ultrasonic sensor.

10. The method as recited in claim 9, wherein the occupant protection device includes at least one of an airbag, an electrically operable side window, a sunroof, a seat, and one of a reversible seat belt tensioner and a pyrotechnical seat belt tensioner, and the airbag includes at least one of a driver airbag, a passenger airbag, a side airbag, a head airbag, a knee airbag, and a window airbag.

11. The method as recited in claim 9, further comprising:
raising a trigger threshold for triggering the occupant protection device in the calculating of the trigger signal as a function of the second signal;
wherein one of (i) only level peaks of the first signal are reduced as a function of the second signal, and (ii) the level of the first signal is reduced by a predefined value as a function of a level of the second signal.

12. The method as recited in claim 11, wherein one of a raising of a trigger threshold and a lowering of a level of the first signal is performed in calculating the trigger signal as a function of one of a characteristic-velocity of the vehicle and a relative velocity of the vehicle with respect to an obstacle.

13. A device for triggering an occupant protection device in a vehicle, comprising:
a first detection device for detecting a first measured variable and for simultaneously generating a corresponding first signal for indicating a necessity for triggering the occupant protection device;
a second detection device for detecting an acceleration value in a z direction and for simultaneously generating a corresponding second signal, wherein the z direction is a vertical direction;
a calculation device for calculating a trigger signal for triggering at least one occupant protection device as a function of the first signal and the second signal, wherein a level of the occupant protection device triggering signal is reduced as a function of at least one of a vertical axis acceleration signal and a vehicle model; and
a trigger device for triggering the occupant protection device as a function of the calculated trigger signal, wherein a deployment threshold for generating the trigger signal is elevated as a function of the acceleration in the z direction.

14. The device as recited in claim 13, further comprising:
a detecting device for detecting a measured variable describing at least one of an area ahead of the vehicle and a vehicle surroundings, and for detecting at least one of an acceleration value in an x direction and an acceleration value in a y direction.

15. A device for triggering an occupant protection device in a vehicle, comprising:
a first detection device for detecting a first measured variable and for simultaneously generating a corresponding first signal for indicating a necessity for triggering the occupant protection device;
a second detection device for detecting an acceleration value in a z direction and for simultaneously generating a corresponding second signal, wherein the z direction is a vertical direction;
a calculation device for calculating a trigger signal for triggering at least one occupant protection device as a function of the first signal and the second signal, wherein a level of the occupant protection device triggering signal is reduced as a function of at least one of a vertical axis acceleration signal and a vehicle model; and
a trigger device for triggering the occupant protection device as a function of the calculated trigger signal; wherein:
a first detecting of an acceleration value in at least one of an x direction and a y direction and a second detecting of at least one of an area ahead of the vehicle and a vehicle surroundings are performed,
simultaneously with at least one of the first detecting and the second detecting, a third signal that is incorporated into the calculating of the trigger signal is simultaneously detected,
the first measured variable includes at least one of an acceleration value in an x direction, an acceleration value in a y direction, and a measured variable that describes at least one of an area ahead of the vehicle and a vehicle surroundings, and the detecting of the first measured variable is performed by an acceleration sensor and the detecting of at least one of the area ahead of the vehicle and the vehicle surroundings are accomplished by one of a radar sensor, a lidar sensor, a video sensor, and an ultrasonic sensor.

16. The device as recited in claim 15, wherein the occupant protection device includes at least one of an airbag, an electrically operable side window, a sunroof, a seat, and one of a reversible seat belt tensioner and a pyrotechnical seat belt tensioner, and the airbag includes at least one of a driver airbag, a passenger airbag, a side airbag, a head airbag, a knee airbag, and a window airbag.

17. The device as recited in claim 15, wherein a trigger threshold for triggering the occupant protection device in the calculating of the trigger signal as a function of the second signal is raised, and wherein one of (i) only level peaks of the first signal are reduced as a function of the second signal, and (ii) the level of the first signal is reduced by a predefined value as a function of a level of the second signal.

18. The device as recited in claim 17, wherein one of a raising of a trigger threshold and a lowering of a level of the first signal is performed in calculating the trigger signal as a function of one of a characteristic-velocity of the vehicle and a relative velocity of the vehicle with respect to an obstacle.

19. A method for triggering an occupant protection device in a vehicle, comprising:
   detecting a first measured variable while simultaneously generating a corresponding first signal for indicating a necessity for triggering the occupant protection device;
   detecting an acceleration value in a z direction while simultaneously generating a corresponding second signal, wherein the z direction is a vertical direction;
   calculating a trigger signal for triggering the occupant protection device as a function of the first signal and the second signal, wherein a level of the first signal is reduced as a function of at least one of the second signal and a vehicle model;
   triggering the occupant protection device as a function of the calculated trigger signal;
   detecting an acceleration value in at least one of an x direction and a y direction, and detecting at least one of an area ahead of the vehicle and a vehicle surroundings; and
   simultaneously with at least one of the first detecting and the second detecting, simultaneously generating a third signal that is incorporated into the calculating of the trigger signal;
   wherein the first measured variable includes at least one of an acceleration value in an x direction, an acceleration value in a y direction, and a measured variable that describes at least one of an area ahead of the vehicle and a vehicle surroundings, and
   wherein the detecting of the first measured variable is performed by an acceleration sensor, and the detecting of at least one of the area ahead of the vehicle and the vehicle surroundings are accomplished by one of a radar sensor, a lidar sensor, a video sensor, and an ultrasonic sensor.

* * * * *